(12) United States Patent
Adler et al.

(10) Patent No.: US 10,750,253 B2
(45) Date of Patent: *Aug. 18, 2020

(54) APPARATUS AND METHODS FOR REMOTELY MONITORING WATER UTILIZATION

(71) Applicant: Flume, Inc., San Luis Obispo, CA (US)

(72) Inventors: Eric Ryan Adler, Sisters, OR (US); Jeffrey Ryan Hufford, Santa Rosa, CA (US); James Joseph Fazio, Carpinteria, CA (US)

(73) Assignee: Flume, Inc., San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,666

(22) Filed: Nov. 15, 2019

(65) Prior Publication Data

US 2020/0084521 A1 Mar. 12, 2020

Related U.S. Application Data

(63) Continuation of application No. 15/980,871, filed on May 16, 2018, now Pat. No. 10,506,307, which is a continuation of application No. 15/283,927, filed on Oct. 3, 2016, now abandoned.

(60) Provisional application No. 62/243,276, filed on Oct. 19, 2015.

(51) Int. Cl.
*H04Q 9/00* (2006.01)
*G01F 15/06* (2006.01)
*G01D 4/00* (2006.01)

(52) U.S. Cl.
CPC ............. *H04Q 9/00* (2013.01); *G01F 15/063* (2013.01); *G01D 4/002* (2013.01); *G01D 4/004* (2013.01); *H04Q 2209/00* (2013.01); *H04Q 2209/10* (2013.01); *H04Q 2209/40* (2013.01); *H04Q 2209/43* (2013.01); *H04Q 2209/60* (2013.01); *H04Q 2209/70* (2013.01); *H04Q 2209/80* (2013.01)

(58) Field of Classification Search
CPC .......... H04Q 2209/00; H04Q 2209/10; H04Q 2209/40; H04Q 2209/43; H04Q 2209/60; H04Q 2209/70; H04Q 2209/80; H04Q 9/00; G01F 15/063; G01D 4/002; G01D 4/004
See application file for complete search history.

(56) References Cited

U.S. PATENT DOCUMENTS

| 8,618,941 | B2* | 12/2013 | Javey | H04Q 9/00 340/605 |
| 10,506,307 | B2* | 12/2019 | Adler | G01F 15/063 |
| 2014/0188421 | A1* | 7/2014 | Fraser | G01F 15/04 702/100 |
| 2014/0277809 | A1* | 9/2014 | Nilsonne | H02J 3/14 700/295 |

(Continued)

*Primary Examiner* — Franklin D Balseca
(74) *Attorney, Agent, or Firm* — Hancock Hughey LLP

(57) ABSTRACT

An apparatus and method for remotely monitoring water usage in real time utilizes a sensor attached to a water meter. The sensor monitors water flowing through the meter by analyzing the water meter's magnetic coupling and processes the data to correlate it to real time flow rates. Data is transmitted through a base unit to remote storage and consumers may access the data with application software installed on electronics such as smartphones and tablets. Four components are combined to allow the real time monitoring of water utilization.

19 Claims, 11 Drawing Sheets

(56) References Cited

U.S. PATENT DOCUMENTS

2015/0379465 A1* 12/2015 Wada ................. G06Q 10/0838
235/376

* cited by examiner

APPARATUS AND METHODS FOR REMOTELY MONITORING WATER UTILIZATION

TECHNICAL FIELD

The present invention relates to the field of water meters and monitoring the volume of water flowing through water meters, as well as water usage data transmission via wireless communication. More specifically, the invention is an apparatus and system which comprises of four components that when combined allow real time monitoring of metered water usage.

BACKGROUND

Water usage and consumption have always been closely monitored in some sectors, such as agriculture and other commercial industries that use large quantities of water. But drought conditions and resource conservation across the United States over the past several years have increased awareness of the importance of water conservation by residential users as well. Understanding limitations on water supply and the effects of drought, as well as the corresponding need to use water wisely and to conserve water resource has been especially felt in the southwest of the United States. California's struggles with drought conditions are well known, and statewide mandatory water consumption reductions have put the issues relating to water conservation in sharp focus for nearly all water consumers.

An integral part of controlling the amount of water that is being consumed is first having access to information about how much water is flowing into the system—for instance, into a residence. Bills from water utilities—sent periodically, typically on a monthly or bi-monthly basis—often itemize usage for the prior billing period, and that information can be useful. Unfortunately, few water users have accurate real-time information about their water usage and there is seldom any way for a water consumer to know how much water is being consumed on a real-time basis.

There are several known methods for remotely monitoring water meters. Of interest are two methods that are currently sold commercially; Automatic Meter Reading (AMR) devices and Advanced Metering Infrastructure (AMI) systems.

AMR devices are either integrated within the meter when manufactured or are offered as a retrofit to water meters already in place. These AMR devices monitor the water meter and store usage data until it is collected via a "water meter reader". Typically, a water meter reader is an employee who will walk up to the meter pit, tap a plastic puck on the lid and wirelessly capture data on their handheld device via RF signal. A similar system is available via a water utility vehicle equipped with a transceiver which, when within range of the AMR device (~100 feet), will wirelessly gather data. This data acquisition is performed periodically by the water utility and is the source of the consumption data present on bills that most residential users see.

AMI systems utilize AMR devices but replace RF connections with cellular connections which communicate with a server to gather usage data generally every 15 minutes.

But neither AMR nor AMI systems are intended for use by residential water consumers. They are designed instead for use by the water utility, are unavailable for purchase by the consumer and generally do not provide the homeowner with information about their water usage, aside from the payment period consumption summary found in the bill from the utility. Given the criticality of using water resources wisely and in some cases reducing water usage required by law to, consumers could benefit directly by having accurate and real time information about their water usage.

SUMMARY OF THE INVENTION

The present invention provides homeowners and/or renters and/or small business or building owners with a system that enables them to remotely monitor their water utilization in real time. The invention described herein is applicable to and useful with the majority of water meters that are used in residential installations—"Dry Dial" meters (DD meters), regardless of whether a specific meter integrates Automatic Meter Reading (AMR) or Advanced Metering Infrastructure (AMI) systems. DD meters are used in about 90 percent of all residences that use water meters.

In a first preferred embodiment the invention comprises:

a. A Node Unit. A node unit that is attached to a water meter that is typically but not always located in a water meter pit—the node unit includes a sensor that is adapted to detect water flow through the water meter by detecting a gradient in a magnetic field and to generate signals in response thereto;

b. A Base Unit. A base unit is in communication with the node unit and is installed in a residence;

c. A Data Storage Installation. A data storage installation such as a cloud server for storage of data and communication between the base unit and the user; and d. Application Software. Application software that may be installed on a user's consumer electronic device such as a smartphone, tablet or desktop machine.

BRIEF DESCRIPTION OF THE DRAWINGS

The invention will be better understood and its numerous objects and advantages will be apparent by reference to the following detailed description of the invention when taken in conjunction with the following drawings.

FIG. 8 is a screenshot from a smartphone running the application software in an iOS app and showing the application menu;

FIG. 9 is a screenshot from a smartphone running the application software in an iOS app and showing daily water utilization, status and month to date water budget;

FIG. 10 screenshot from a smartphone running the application software in an iOS app and showing historical utilization, daily bar chart and period overview consisting of a maximum and minimum usage;

FIG. 11 is a screenshot from a smartphone running the application software in an iOS app and showing some water recordings of various devices or time periods;

FIG. 12 is a screenshot from a smartphone running the application software in an iOS app and showing vacation period and water set limit;

DETAILED DESCRIPTION OF PREFERRED AND ILLUSTRATED EMBODIMENTS

Figure 1:
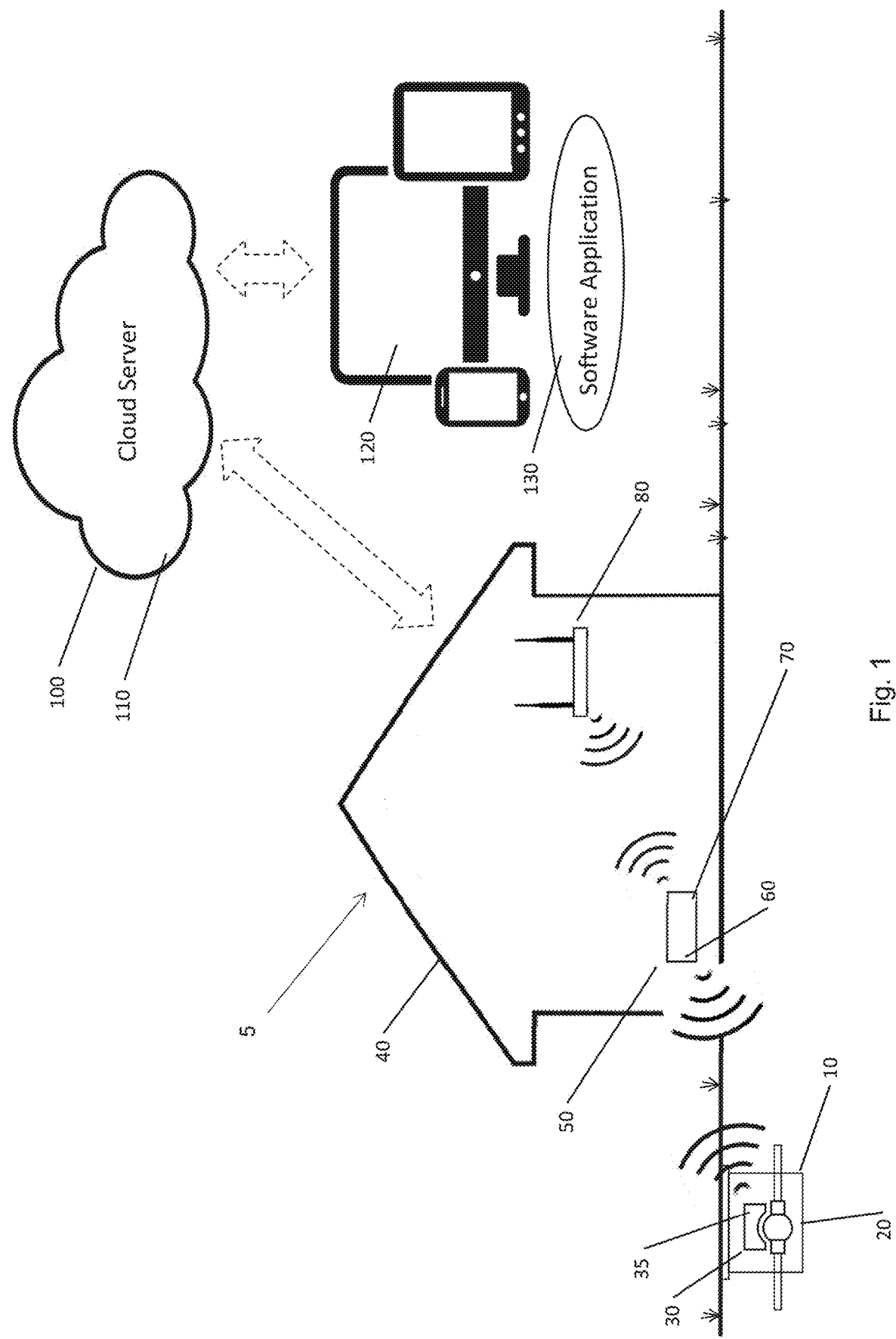
FIG. 1 is a schematic illustration that shows apparatus and method according to the present invention, and more specifically, shows the flow of real time water usage information from the point of data acquisition at the water meter to the presentation of utilization data via software applications.

The invention will now be described in detail with reference to the drawings. With reference to FIG. 1, a first preferred embodiment of the water meter utilization apparatus according to the invention is shown schematically as it would be installed in a typical residence. The invention is referenced generally with reference number 5 and the invention comprises four basic components, each of which is described in detail below:

1) Node Unit. A node unit 30, also referred to herein as a water meter module 30, that is attached to a water meter 20, which as noted is typically located in a water meter pit 10—the node unit 30 includes a sensor that is adapted to detect water flow through the water meter by detecting a gradient in a magnetic field and to generate signals in response thereto;
2) Base Unit. A base unit 50 that is installed in a residence 40;
3) Data Storage Installation. A data storage installation 100 such as a cloud server 110; and
4) Application Software. Application software 130 that may be installed on consumer electronic devices such as a smartphone, tablet or desktop machine, all of which are identified with reference number 120.

As shown generally in FIG. 1, the acquisition of water usage data according to the present invention begins at the water meter 20, generally located outside of the home in meter pit 10 typically under a steel or concrete lid.

For background purposes, approximately 90 percent of residential water meters are Dry Dial water meters that incorporate an internal magnet to measure volumetric flow, and about 5 percent of water meters used in residential installations are electromagnetic type meters that have no moving parts. Both of these meters measure the volumetric flow rate of water flowing through them and the apparatus and method of the present invention is adapted for use with both of these types of meters. The remaining approximately 5 percent of consumer water meters are the wet dial type meters, which the present invention cannot monitor.

Figure 2:
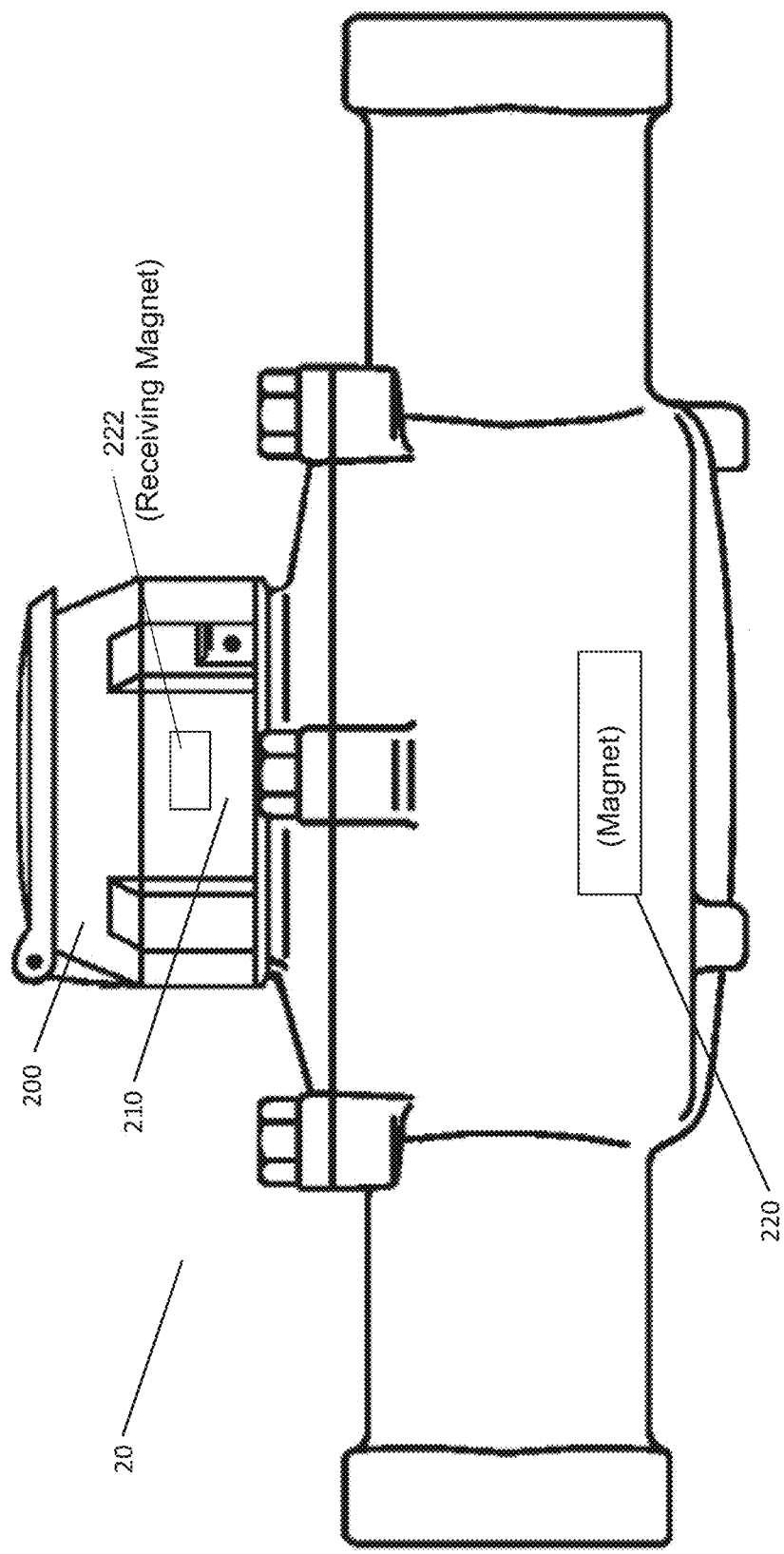
FIG. 2 is a schematic side elevation view of a typical residential water meter of the type with which the present invention is used.

Explained in simple terms, a Dry Dial Meter (DDM) 20 is a device that records water consumption by transferring motion from inside the meter to a register via a magnetic coupling. This coupling constantly records usage as water passes through the meter. A magnet 220 is attached to the disc or turbine inside of the meter that "nutates" or spins, see FIG. 2 where the magnet is shown schematically. The magnet 220 inside the meter is called the "driving magnet" and performs one revolution for every rotation of the turbine or nutation of the disc. As the turbine spins or disc rotates the "driving magnet" it interacts magnetically with a "receiving magnet" 222 on the top of the meter 210. This receiving magnet 222 in turn drives the register gears and records a count 200 for the cubic feet of water used.

In contrast, an Electromagnetic Meter (EM) contains no moving parts, has a digital register and most importantly has a "digital out" port that is an available connection by third party devices such as the present invention. Within the meter a magnetic field is applied to a metering tube and this results in a potential difference proportional to the flow velocity perpendicular to the flux lines of the field. The physical principle at work is electromagnetic induction. The magnetic flow meter requires a conducting fluid, for example water that contains ions, and an electrical insulating pipe surface, for example, a rubber-lined steel tube. A microprocessor in the meter determines flow rate and usage from the gathered information and records it on a digital register.

With a Dry Dial meter, the flow of fluid through a metering tube and the resulting difference in magnetic field strength generates a sinusoidal wave that may be monitored and which may be correlated to the volume of water flowing through the meter.

Figure 3:
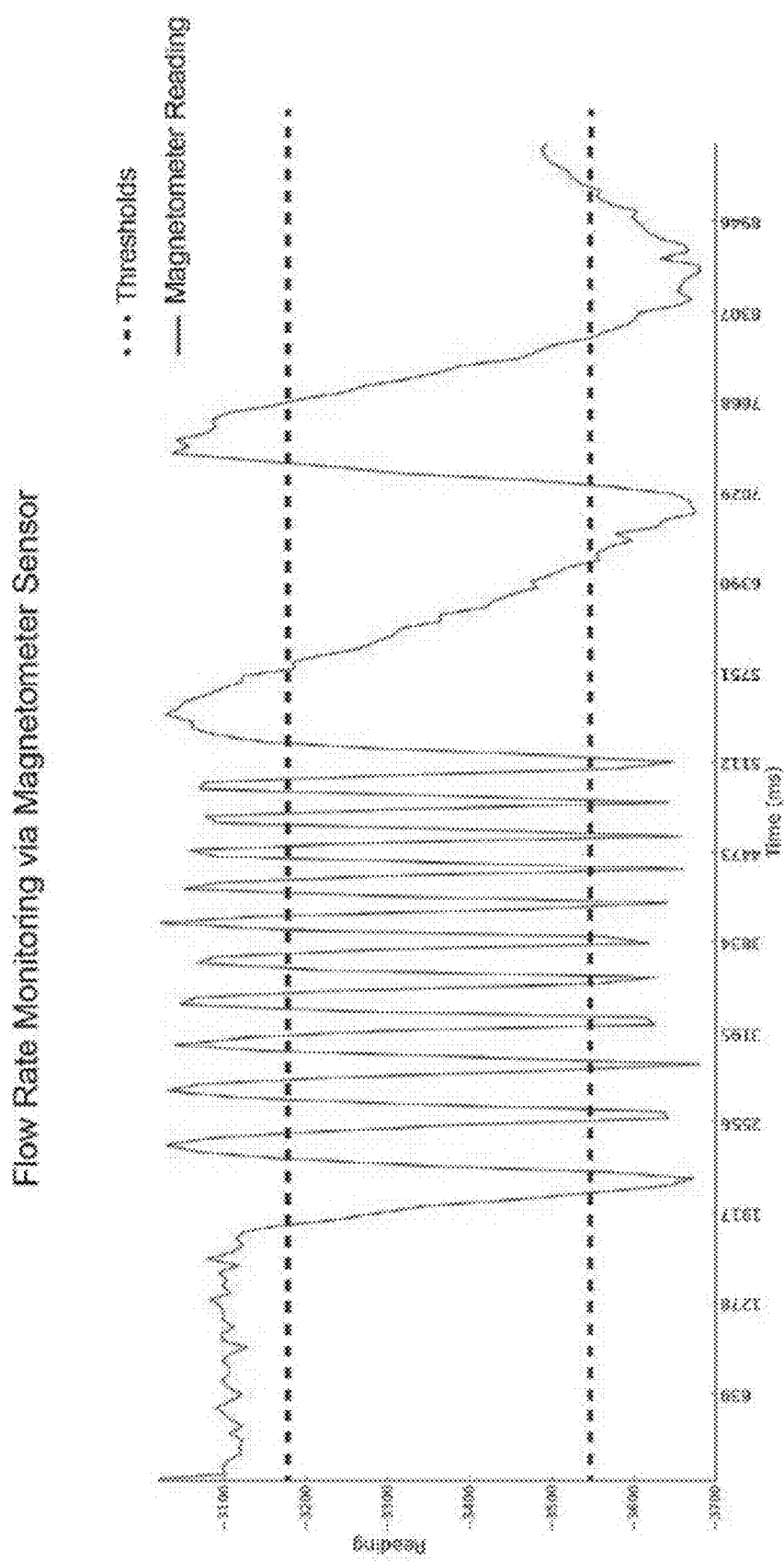
FIG. 3 is a graph showing the magnetic signal received by the microcontroller from the sensor when the sensor is attached to the water meter.

With reference to FIG. 3, a graph illustrating the sinusoidal wave is illustrated. In order to determine the number of magnetic revolutions that have occurred, software detects the "peaks" and "troughs" of this sinusoidal wave. By doing so, the number of magnetic cycles that have occurred may be determined and, in turn, the volumetric flow of water and amount used over a specific time interval may be determined based upon the number of magnetic cycles.

Node Unit 30

As detailed below, the optimal placement location for node unit 30 is determined during installation wherein the software determines the average intensity of the magnetic field at the peaks and the troughs. The software then sets "thresholds" for peak and trough detection at some percentage of the difference between the peak and trough values. These thresholds are represented graphically by the dashed lines in FIG. 3, which uses, as an example, a 20% threshold for each. A "peak" is counted whenever the signal rises above the upper threshold, or falls below the lower threshold.

Figure 4:
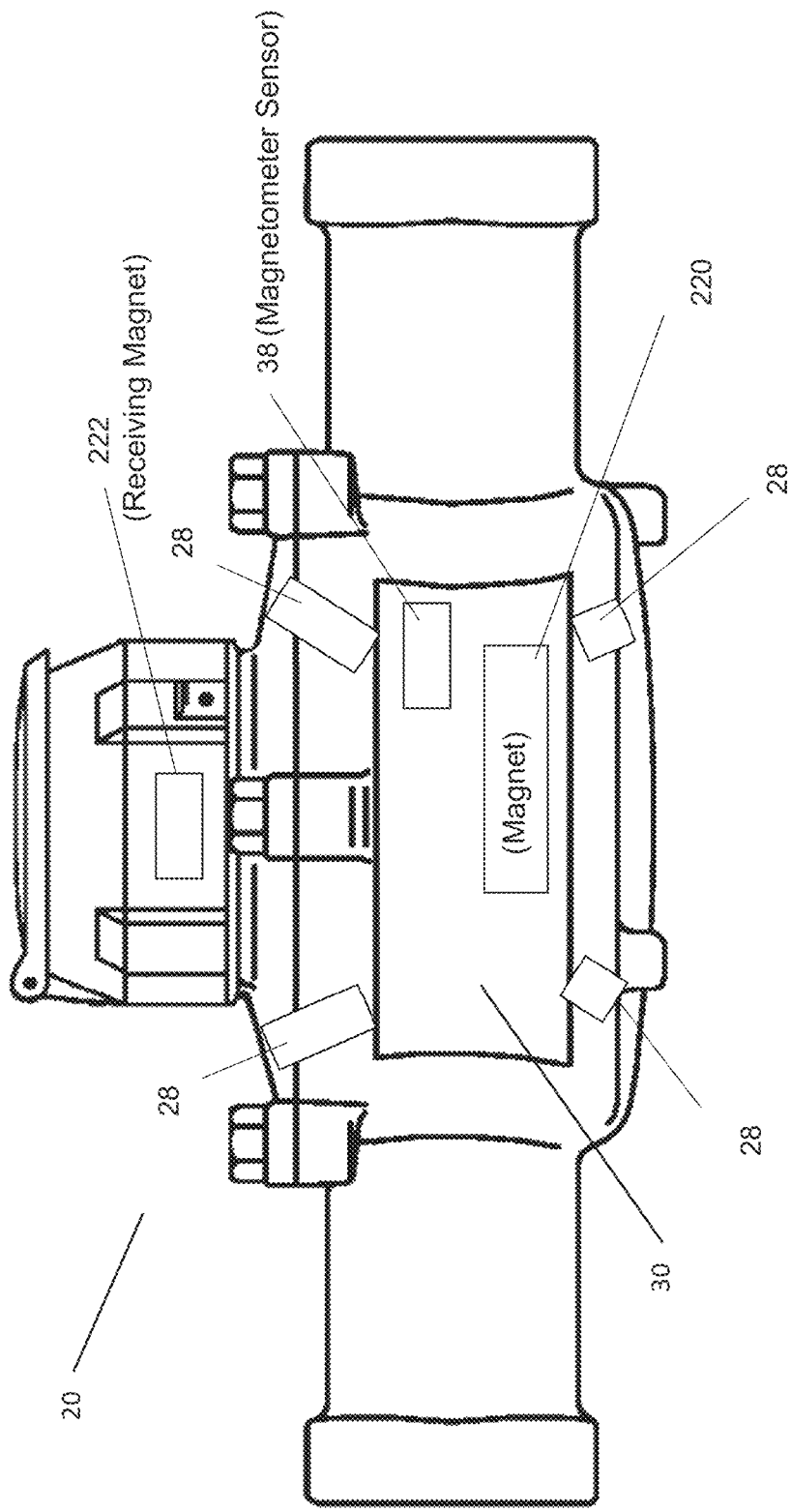
FIG. 4 is a drawing of one preferred method for attaching a node unit containing a sensor to a water meter.

As best illustrated in FIG. 4, node unit 30 is attached to the water meter 20; as noted above, the node unit is attached to the water meter 20 at an optimal location—the process of determining the optimal mounting position is explained below. With returning reference to FIG. 1, and as detailed above, the water meter 20 is located in the meter pit 10 and base unit 50 is located in residence 40. FIG. 4 illustrates schematically one preferred method of attaching a node unit 30 to the water meter 20; mounting is facilitated with adjustable fastening straps 28 positioned at each end of each of the node unit 30, utilizing a slot for attachment of the strap 28 to the node unit. The straps 28 may be elastic hook and loop straps or zip ties or analogous attachment members. The straps 28 are used to secure the node unit 30 onto the meter 20. Those of skill in the art will recognize that there are many alternative and equivalent ways of attaching the node unit 30 to the meter 20.

A sensor 38 is contained within the node unit 30 and is thereby retained closely next to the water meter when the bracket is attached to the meter as shown in FIG. 4. In FIG. 4 sensor 38 is shown schematically. Several commercially available electromagnetic sensors 38 may be used with the present invention. One preferred sensor is a three-axis magnetic sensor provided by STMicroelectronics (www.st- .com) and sold under the part number LIS3MDL. As used herein with a Dry Dial meter, as water passes through the water meter 20 the magnet 220 in the meter (described above) spins. A single revolution of the magnet correlates to a specific and known volume of water passing through the meter. The sensor detects changes in the magnetic field caused by rotation of the magnet and water flow data (flow rate, volume, etc.) may be derived therefrom.

Figure 5:
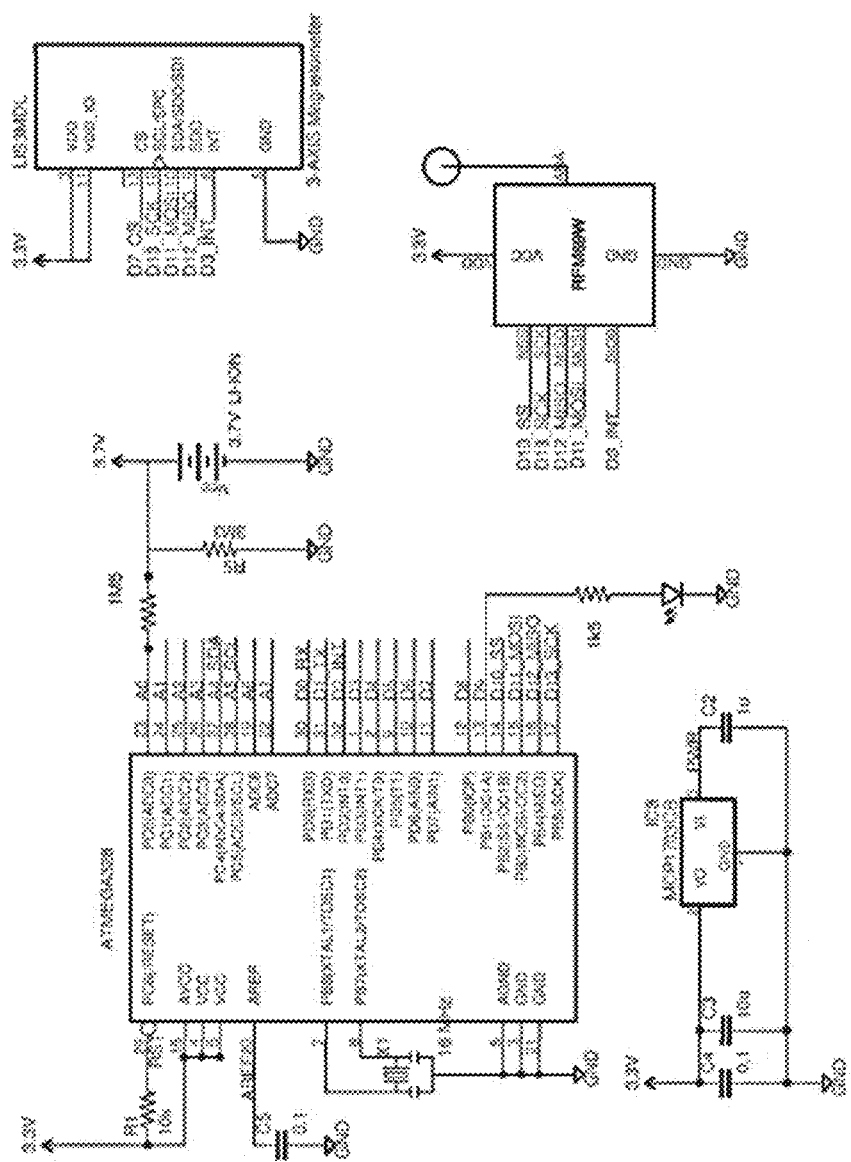
FIG. 5 is an exemplary circuit diagram for the node unit according to the present invention.

Referring back to FIG. 1, node unit 30 includes a microcontroller 35 that is powered with one or more batteries, a transceiver, and other electronics as shown in the exemplary circuit diagram of FIG. 5 and all of which are housed with the housing that defines the container for node unit 30. The microcontroller 35 in node unit 30 is adapted for receiving signals from the sensor 38 for processing the signals to correlate the signals to volumetric flow of water through the meter, and for transmitting data from the node unit, typically in the unlicensed frequency range via a 915 MHz RF connection to the base unit 50 in the residence 40.

Base Unit 50

Figure 6:
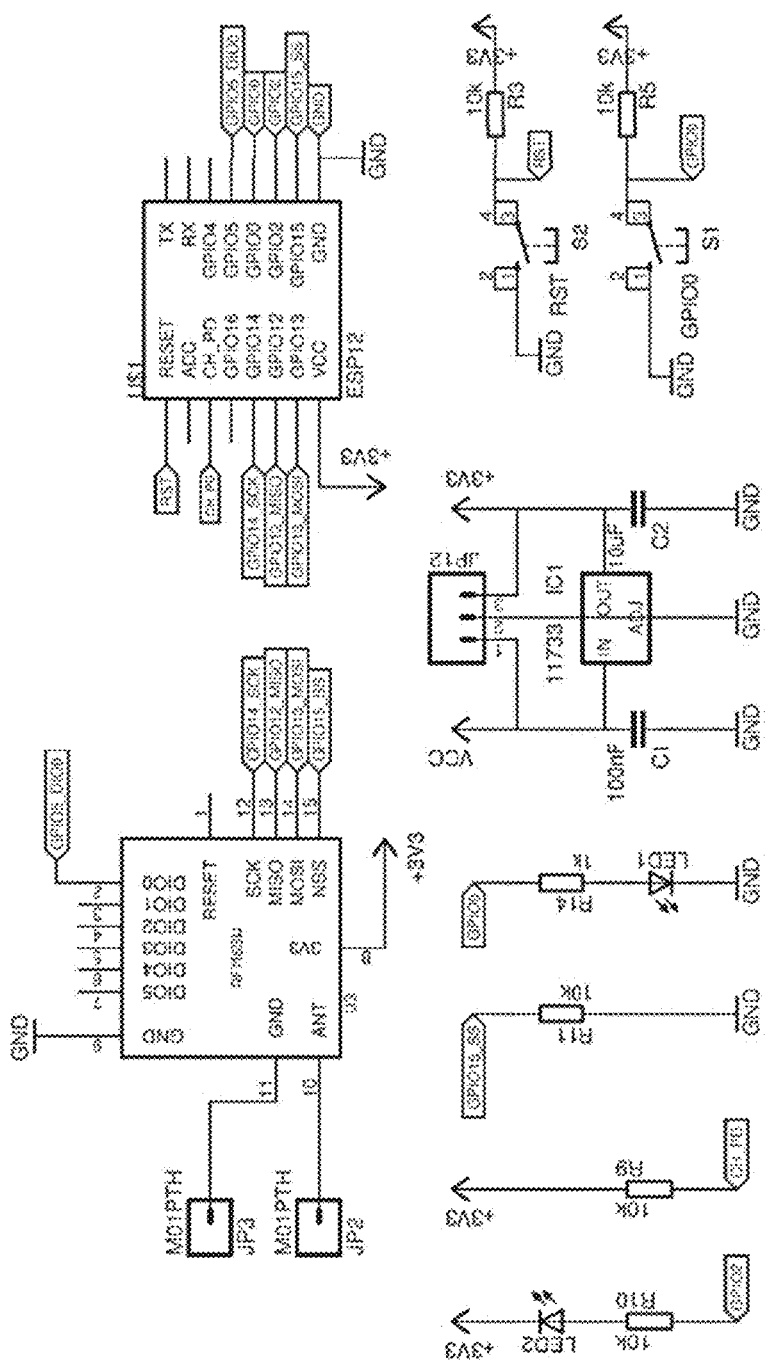
FIG. 6 is an exemplary circuit diagram for the base unit according to the present invention.

Base unit 50 preferably and typically incorporates a transceiver and a 915 MHz antenna for communication with node unit 30 and a WiFi antenna 70 operating as an internet connected gateway or data bridge between a node unit 30 and the house 40 wireless Access Point (AP) 80. An exemplary circuit diagram for base unit 50 is shown in FIG. 6 and the WiFi signals transmitted between components of the invention are illustrated with a WiFi symbol of the type that is commonly in use.

The customer AP 80 utilizes WiFi communication to the base unit 50, which is paired during the installation process. Data is relayed through the AP to data storage installation 100, which preferably is a cloud server 110.

Data Storage Installation 100

As noted, data storage installation 100 is preferably a cloud-based server 110. Other data storage facilities may be used in the alternative.

Figure 7:
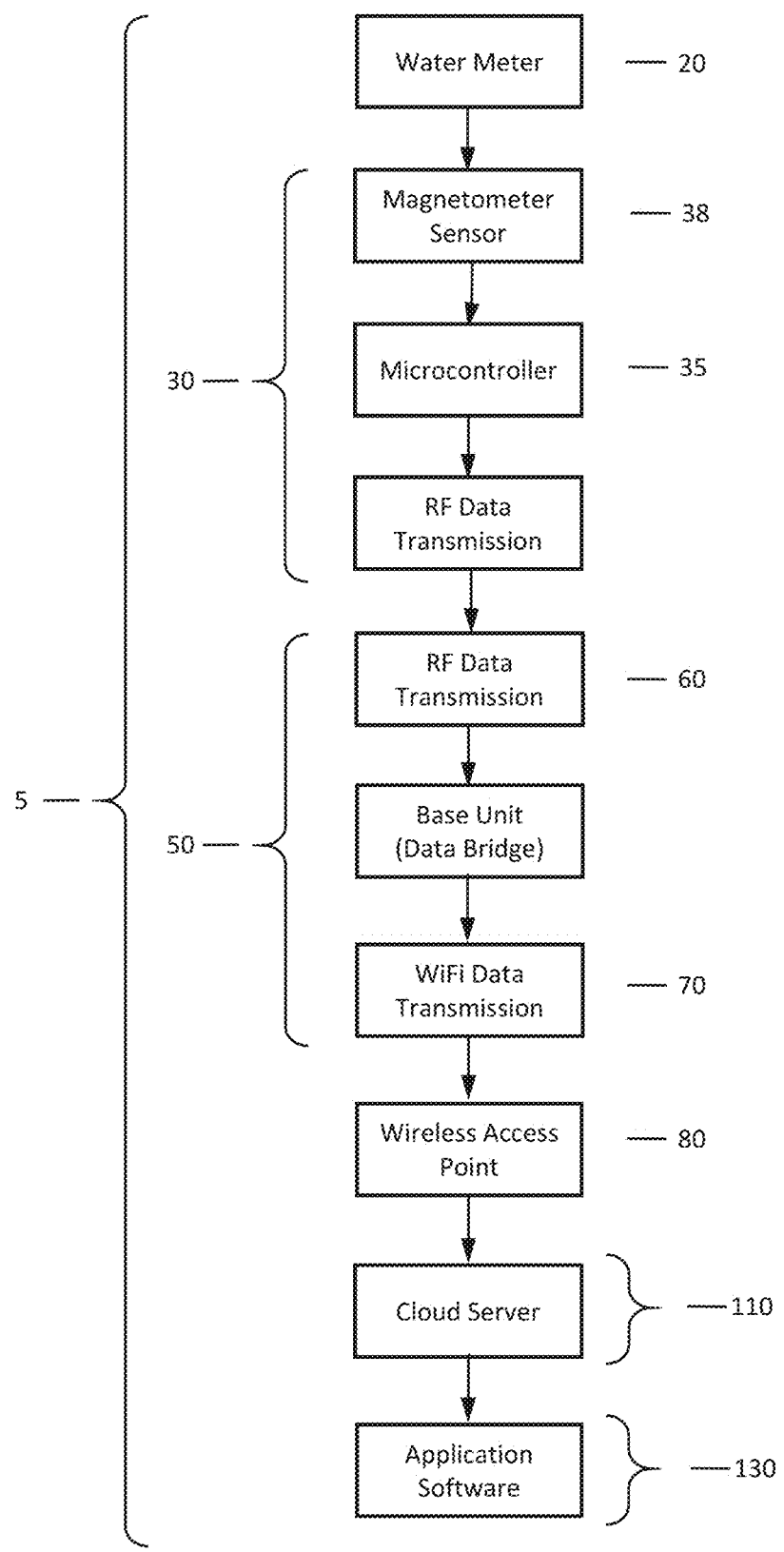
FIG. 7 is a block diagram showing an exemplary data flow from the meter through the application.

With reference to FIG. 7, a block diagram illustrates the basic flow of data through that apparatus and system 5 according to the invention. Within node unit 30, the signals detected from the magnetic field created by water flowing through water meter 20 are detected by sensor 38, processed by microcontroller 35, and transmitted with a 915 MHz RF signal. Utilization of a 915 MHz signal transmission provides numerous advantages over other modes of signal transmission such as cellular transmission, including the elimination of fees that may be associated with cellular phone usage, greatly reduced power consumption relative to cellular signals and transmission, and the ability to use the apparatus and system 5 in locations that are not served by cellular coverage. The transmitted data are received by antenna 60 of base unit 50, which as noted above functions as a data bridge so that data are transmitted from the base unit 50 via antenna 70 and a WiFi connection through the Wireless Access Point to remote data storage at cloud server 110. The data may then be accessed by the homeowner with software application that is installed on an electronic device 120.

In some embodiments, the microcontroller 35 within the node unit 30 may be setup to provide water utilization data after a set number of readings, period of time, upon a special event. Special events may be indicated with an alert and may include: utilization exceeding a set threshold, leak detection, unexpected usage or low battery condition.

Application Software 130

The software 130 used in accordance with the invention provides a data rich platform that allows the consumer to visualize water consumption data in many different formats. For example, the software is capable of presenting water utilization in a variety of visually useful formats, in real time, including charts of various types with variable data criteria.

FIGS. 8 through 12 are exemplary screenshots of the software application 130 running on both a web browser and/or a mobile device to illustrate just a few of the ways that water usage data can be displayed and analyzed.

Figure 8:
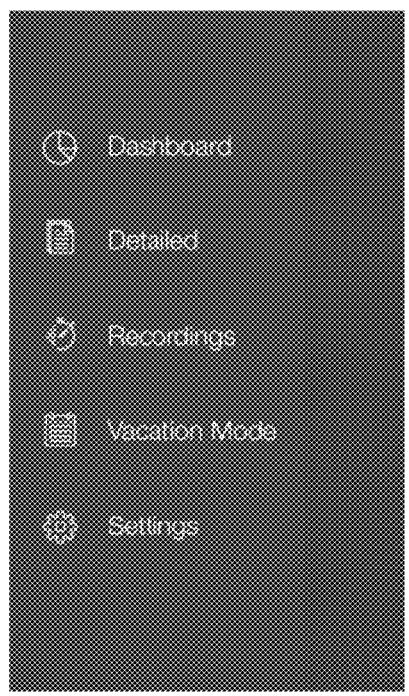
FIGS. 8 through 12 are a series of drawings representative of screenshots of the application software according to the present invention running and electronic devices and showing the data rich platform provided by the software. More specifically.

FIG. 8 is an exemplary illustration of an application software 130 menu screen running on, for example, a smartphone.

Figure 9:
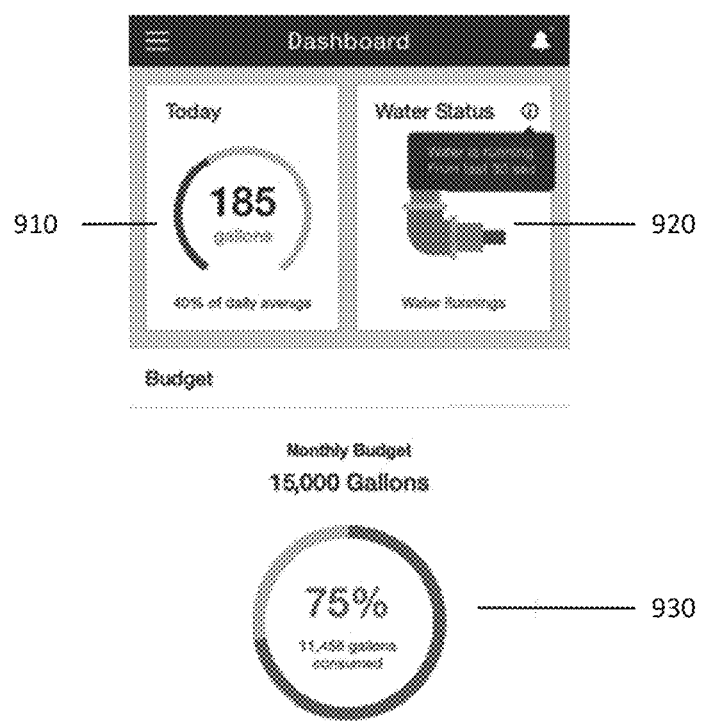

FIG. 9 illustrates what a dashboard screen may look like. The dashboard shows today's water utilization as a percentage of average daily use at 910, water status at 920, and month-to-date usage of water against the monthly water budget at 930.

Figure 10:
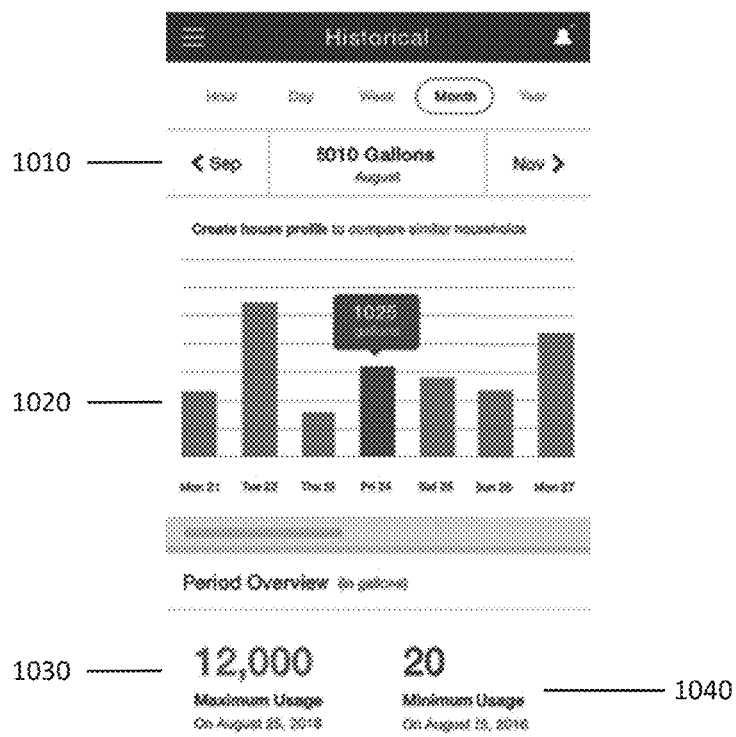

FIG. 10 illustrates what a historical screen may look like. Water usage broken down by the hour, day, week, month and year at 1010. Comparisons to similar households are shown at 1020 and additional period information, including maximum 1030 and minimum 1040 usage numbers and dates.

Figure 11:
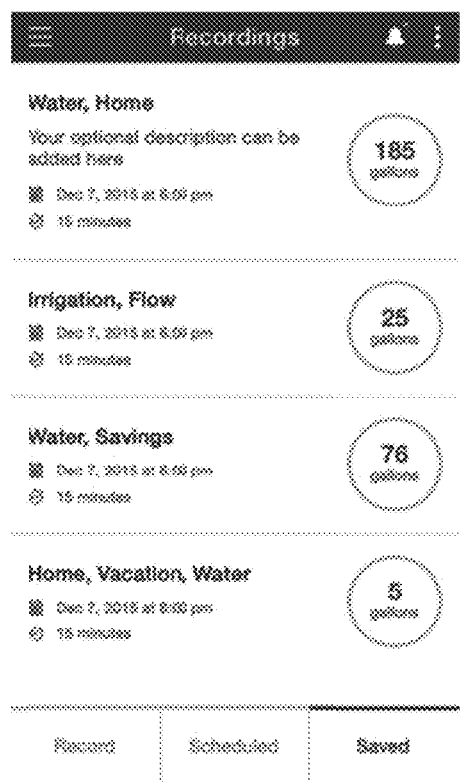

FIG. 11 illustrates the ability of a user to record water usage events. Among other things, users can set up scheduled recordings such as irrigation that automatically record water usage during such events.

Figure 12:
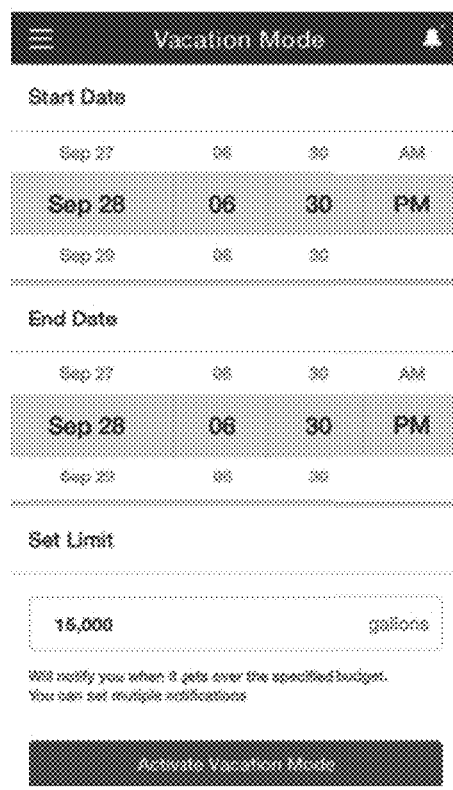

FIG. 12 illustrates how a user could set up a special notification for when they are away from the building/household for an extended period of time. If usage exceeds a threshold value that the user has set, the user will be notified.

Figure 13:
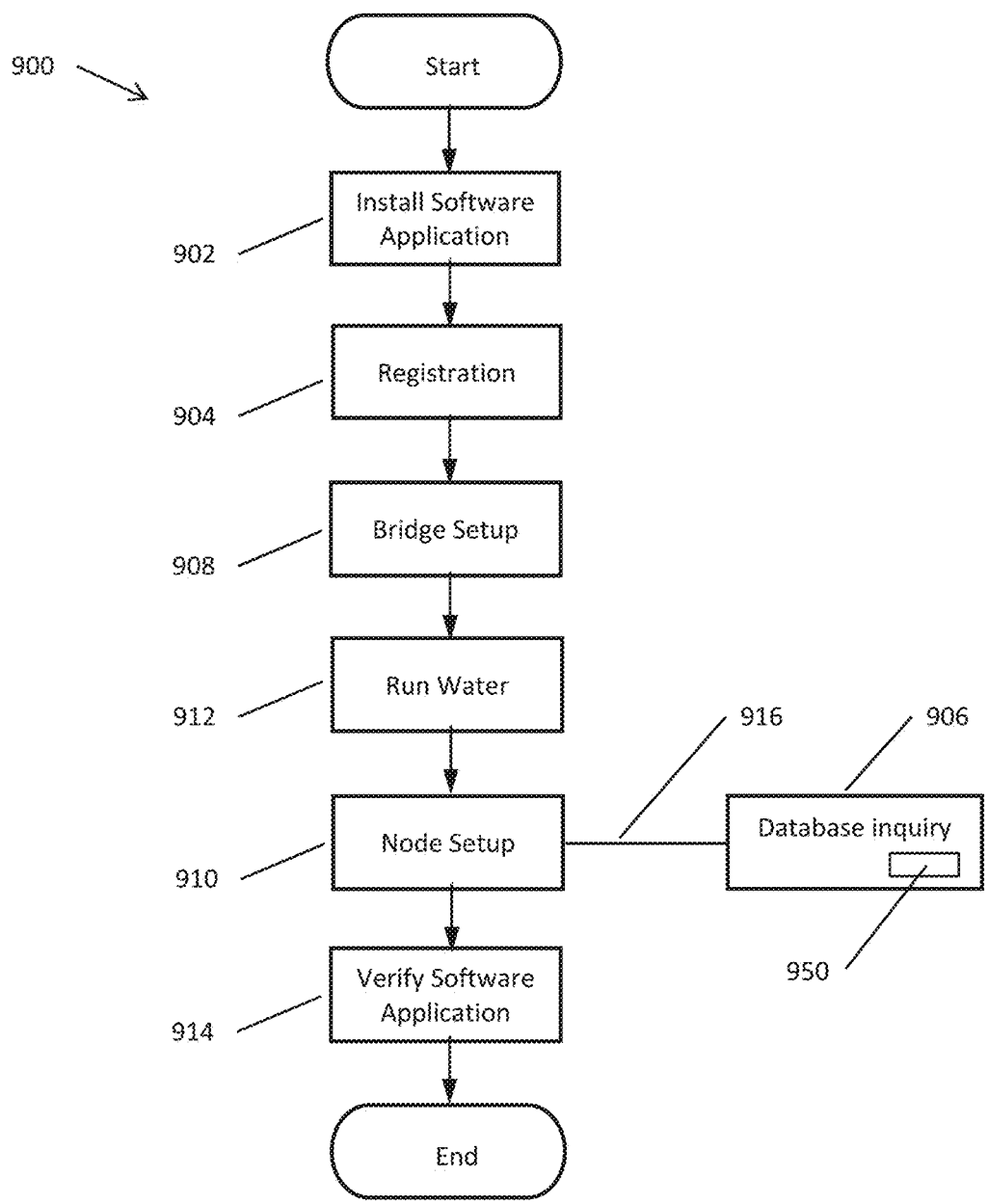
FIG. 13 is a block diagram that illustrates the installation process that is followed as various components of the invention are being installed.

FIG. 13 is a block diagram that illustrates the basic installation process 900 that the installer will use when initially installing the apparatus and system 5. With the software application 130 installed on a desktop and/or mobile device 120 (at step 902) the registration process 904 creates a user account associated with the serial numbers of the node unit 30 and base unit 50—the node unit 30 and base unit 50 are provided with QR or analogous optically read codes and the codes are scanned.

The bridge unit 50 is then cabled and powered on to pair the bridge unit with AP 80 and its associated password if implemented at step 908.

At step 912 the water flow is turned on in preparation for node setup.

Next, at step 910, the node unit 30 is located on the meter 20 in an optimal location. The optimal location for placement of the node unit 30 relative to water meter 20 is determined by moving the node unit 30 around the water meter while observing a visible LED that becomes illuminated when the note unit 30 is located optimally.

Optionally an optimal location may be provided using a picture for a particular meter model instead of using an LED to indicated optimal placement as described above. An inquiry may be made at step 906 to a database 950 that is stored in cloud server 100 to obtain location information specific to the commercial model and type of water meter 20.

And as another option, as part of the node setup process 910 an inquiry is made at step 906 to a database 950 that is stored in cloud server 100 to obtain volume information that is specific to the commercial model and type of water meter 20, as detailed below.

No calibration of apparatus and method 5 is required. The working capacities of all commercially water meters 20, including volumetric flow rates, is provided by the manufacturers of the water meters and is available. A database 950, preferably stored in cloud server 906, contains characterizing information for commercially available water meters with which the present invention may be used. More specifically, the database 950 includes for each type of commercially available water meter information on the nutations/ft$^3$ (revolutions per cubic foot of water) and this information is correlated in the database with the water meter manufacturer name and model number.

As such, by knowing what specific water meter is installed in any particular installation—the manufacturer and model number—the characterizing date of the water meter, flow rates, capacity, etc. is known. During the node setup step 910 the installer may optionally enter water meter identifying data 916 relating that identifies specific model number and serial number of the water meter 20 that is in any particular installation. This water meter identifying information 916 may also be entered by scanning, for example, a QR code on the water meter. An inquiry is made of database 950 to obtain characterizing data for the specific model and type of water meter and that data is entered into the user account associated with node unit 30. The node module sends a count of magnetic pulses to the server and the server performs a database lookup of the meter type that is configured in the node setup step 910 to calculate volume.

To verify the system 5, step 914 a "Welcome to the Flume Water Monitoring Solution" may be displayed indicating real-time water monitoring is being performed by the system 5.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

We claim:

1. A system for monitoring water flow through a water meter in real time, comprising:
    a water meter module comprising a sensor capable of detecting changes in a magnetic field as water flows through the water meter and for generating signals in response to detected changes in the magnetic field, a microcontroller adapted for receiving the signals from the sensor and for processing the signals to correlate the signals to a volumetric flow of water through the water meter to thereby generate water utilization data, and a transmitter for transmitting the water utilization data at about 915 MHz;
    a receiving station in a residence that is remotely located from the water meter module and adapted for receiving the water utilization data transmitted from the water meter module, the receiving station wirelessly connected to a wireless access point in the residence that establishes a communication network and adapted for transmission of the water utilization data to the communication network;
    a remote storage facility containing a database with identification data for the water meter, the identification data comprising manufacturer and model of the water meter and the remote storage facility adapted for receipt of the water utilization data transmitted from the receiving station via the communication network, and for storing the water utilization data;
    wherein the water utilization data are transmitted to the remote storage facility and the identification data for the water meter are correlated with the water utilization data to calculate, without calibration, a volume of water flowing through the water meter.

2. The system according to claim 1 including an electronic device with application software for connecting to the remote storage facility to provide real time information regarding the water flow through the water meter.

3. The system according to claim 1 in which the water utilization data are based on threshold values.

4. The system according to claim 3 in which the water meter module determines high and low levels of the magnetic field and the threshold values are a percentage of the high and low values.

5. The system according to claim 2 in which the water utilization data are displayed on the electronic device as a function of water utilization over time.

6. The system according to claim 5 in which the water utilization data are displayed on the electronic device including a display of unexpected water utilization data as a function of time.

7. The system according to claim 1 in which the water meter is a dry dial meter.

8. The system according to claim 1 in which the water meter is an electromagnetic meter.

9. The system according to claim 1 wherein the water meter is in a location that does not have cellular coverage.

10. A system for monitoring water flow through a water meter, comprising:
    a module adapted for attachment to the water meter and including a sensor capable of detecting changes in a magnetic field as water flows through the water meter and for generating signals in response to detected changes in the magnetic field, a microcontroller adapted for receiving the signals from the sensor and for processing the signals to correlate the signals to a volumetric flow of water through the water meter to thereby generate water utilization data, and a transmitter for transmitting the water utilization data;
    a receiving station in a residence that is remotely located from the module and adapted for receiving the water utilization data transmitted from the module;
    a communication network associated with the residence, the communication network adapted and for transmission of the water utilization data;
    a remote storage facility adapted for receiving the water utilization data transmitted via the communication network and containing a database with identification data for the water meter, the identification data comprising manufacturer and model of the water meter;
    wherein the water utilization data are transmitted to the remote storage facility and the identification data for the water meter are correlated with the water utilization data to calculate, without calibration, a volume of water flowing through the water meter.

11. The system according to claim 10 in which the communication network further comprises a wireless access point (WAP) associated with the residence.

12. The system according to claim 11 in which the WAP is located within the residence.

13. The system according to claim 11 wherein the water meter is in a location that does not have a cellular signal.

14. The system according to claim 13 wherein the water utilization data are transmitted from the transmitter at about 915 MHz.

15. A system for monitoring water flow through a water meter, comprising:
    a water meter module adapted for attachment to the water meter, the water meter module having a sensor capable of detecting changes in a magnetic field created as a turbine with the water meter nutates and for generating signals in response to detected changes in the magnetic field, a controller adapted for processing the signals and correlating the processed signals to a volumetric flow of water through the water meter to thereby generate water utilization data, and a transmitter for transmitting the water utilization data at about 915 MHz;

water utilization data communications means located within a residence associated with the water meter and for receiving the water utilization data from the water meter module and for transmitting the water utilization data through a communications network;

a database comprising identification data for the water meter, the identification data including manufacturer and model of the water meter, wherein the water utilization data are transmitted through the communications network to the database where the identification data for the water meter are correlated with the water meter water utilization data to calculate, without calibration, a volume of water flowing through the water meter.

16. The system according to claim 15 wherein the water utilization data communications means further comprises a base station adapted for receiving the water utilization data transmitted from the water meter module and a wireless access point for transmission of the water utilization data to the database.

17. The system according to claim 16 in which the residence does not have cellular service.

18. The system according to claim 17 including an electronic device with application software for connecting to the database to provide real time information regarding the water flow through the water meter.

19. The system according to claim 15 in which the water meter is a dry dial meter.

* * * * *